(12) United States Patent
Kowalkiewicz et al.

(10) Patent No.: US 8,429,668 B2
(45) Date of Patent: Apr. 23, 2013

(54) WORKFLOW TASK RE-EVALUATION

(75) Inventors: Marek Kowalkiewicz, St. Lucia (AU); Stefan Baeuerle, Rauenberg-Rotenberg (DE); Marita Kruempelmann, Dielheim (DE); Ruopeng Lu, Taringa (AU)

(73) Assignee: SAP AG, Walldorf (DE)

( * ) Notice: Subject to any disclaimer, the term of this patent is extended or adjusted under 35 U.S.C. 154(b) by 963 days.

(21) Appl. No.: 11/952,929

(22) Filed: Dec. 7, 2007

(65) Prior Publication Data

US 2009/0150900 A1 Jun. 11, 2009

(51) Int. Cl.
G06F 9/46 (2006.01)

(52) U.S. Cl.
USPC .......................................................... 718/106

(58) Field of Classification Search .................... 718/106
See application file for complete search history.

(56) References Cited

U.S. PATENT DOCUMENTS

| | | | |
|---|---|---|---|
| 6,011,917 A * | 1/2000 | Leymann et al. | 717/104 |
| 2002/0010803 A1 * | 1/2002 | Oberstein et al. | 709/318 |
| 2004/0133457 A1 * | 7/2004 | Sadiq et al. | 705/7 |
| 2005/0172288 A1 * | 8/2005 | Ahuja et al. | 718/101 |
| 2007/0156485 A1 * | 7/2007 | Sanabria et al. | 705/8 |
| 2008/0255909 A1 * | 10/2008 | Joshi et al. | 705/8 |

OTHER PUBLICATIONS

Nick Russell et al., "Exception Handling Patterns in Process-Aware Information Systems" BPM Center Report BPM-06-04, BPMcenter.org, 208.

* cited by examiner

*Primary Examiner* — Li B Zhen
*Assistant Examiner* — Bradford Wheaton
(74) *Attorney, Agent, or Firm* — Mintz, Levin, Cohn, Ferris, Glovsky and Popeo, P.C.

(57) ABSTRACT

An occurrence of a workflow re-evaluation event during execution of tasks in a workflow is identified. In response to the workflow re-evaluation event, it is determined for each task previously executed in the workflow whether such task needs to be executed again. Those tasks in the workflow for which it was determined that the corresponding task needs to be executed again are executed again, while the tasks in the workflow that were previously executed and for which it was not determined that the corresponding task needs to be executed again are skipped. Related apparatus, systems, techniques and articles are also described.

16 Claims, 4 Drawing Sheets

Re-evaluation conditions on activity level

Manager approval re-evaluation conditions
If (BOPurchOrd.Product.Price > BOPurchOrdOld.Product.Price AND BOPurchOrdOld.ManagerRejected = FALSE) then execute
Else skip

Cost center approval re-evaluation conditions
If ((BOPurchOrd.Product.Price > BOPurchOrdOld.Product.Price AND BOPurchOrdOld.CostCenterRejected = FALSE) OR BOPurchOrd.PCostCenter <> BOPurchOrdOld.CostCenter) then execute
Else skip

Dangerous goods department re-evaluation conditions
If BOPurchOrdrProduct.Name <> BOPurchOrdOld.Product.Name then execute
Else skip

Re-evaluation conditions on workflow level

If (BOPurchOrd.Product.Name.Changed OR BOPurchOrd.Product.Price.Changed OR BOPurchOrd.CostCenter.Changed) then re-evaluate

Control flow conditions on Splits (OR-Joins)
Ch1: If BOPurchOrd.Product.Price <= 1000 then C12
Else C11
Ch2: If BOPurchOrd.ManagerRejected = TRUE then C22
Else C21
Ch3: If BOPurchOrd.Product.Price <= 10000 then C32
Else C31
Ch4: If BOPurchOrd.CostCenterRejected = TRUE then C42
Else C41
Ch5: If BOPruchOrd.Product.Category <> "Dangerous" then C52
Else C51
Ch6: If (BOPurchOrd.ManagerRejected = FALSE AND BOPurchOrd.CostCenterRejected = FALSE AND BOPurchOrd.DangerousGoodsRejected = FALSE) then C62
Else C61

BOPurchaseOrder
String BOPurchOrd.Product.Name
Integer BOPurchOrd.Product.Price
String BOPurchOrd.Product.Category
String[] BOPurchOrd.CostCenter
Bin BOPurchOrd.ManagerRejected = FALSE
Bin BOPurchOrd.CostCenterRejected = FALSE
Bin BOPurchOrd.DangerousGoodsRejected = FALSE

WORKFLOW TASK RE-EVALUATION

TECHNICAL FIELD

The subject matter described herein relates to techniques for re-evaluating execution of tasks within a workflow.

BACKGROUND

Graphical (graph based) process modeling languages have gained wide acceptance and are more frequently used in business applications, where ease of use is often considered to be as important as the expressiveness of a language. Graphical process modeling languages are widely considered the most intuitive. Typically, graphical process modeling languages allow for expressing control-flows, or ordering dependencies among tasks, in a process. Expressing other process properties, such as data flows and resource use requires using extended graphical notations.

Traditionally, workflows have been delivered effectively in high volume production processes, where possible outcomes and deviations from the plan can be easily foreseen. However, in the emerging knowledge economy, the human factor plays greater and greater role in process execution, and new situations have to be taken into account. A good example of such situations can be seen in e-procurement processes, where customers often decide to cancel an order while it is being executed (for example, buying a book from e-tailer and later contacting the bookstore to revoke the order), change the ordered products (changing order from book "A" to book "B"), change the destination address, and the like.

A typical approach, when unexpected changes are introduced, is to cancel the process execution and invoke the process once again. However, with such an arrangement, some tasks that have been executed in the previous instance, might not have to be re-executed, as the change that triggered cancellation and new execution is not relevant for them.

SUMMARY

In one aspect, an occurrence of a workflow re-evaluation event during execution of tasks in a workflow is identified. In response to the workflow re-evaluation event, it is determined for each task previously executed in the workflow whether such task needs to be executed again. Those tasks in the workflow for which it was determined that the corresponding task needs to be executed again are executed again, while the tasks in the workflow that were previously executed and for which it was not determined that the corresponding task needs to be executed again are skipped.

The workflow re-evaluation event can be initiated, for example, when a business object for which the workflow has been defined is modified. In some implementations, the workflow re-evaluation event is only associated with certain entities in the business object, so that modification of some entities causes the workflow re-evaluation event to be initiated, while modification of other entities might not cause the workflow re-evaluation event to be initiated.

The workflow re-evaluation event can be assigned to various granularities of the workflow, for example, the overall workflow, a single task in the workflow, or a group of tasks (e.g., a workflow fragment, etc.) in the workflow.

In order to determine whether a task must be executed again, each task can be associated with one or more re-evaluation rules, and it can be determined whether each task needs to be executed again based on the associated re-evaluation rules. Some tasks may have "custom" re-evaluation rules, while other tasks may be subject to "default" re-evaluation rules.

When a workflow re-evaluation event is identified, all active tasks in the workflow can be suspended. Suspended tasks in the workflow for which it was determined that the corresponding task needs to be executed again are executed, while any other suspended active tasks are canceled upon completion of the workflow.

In an interrelated aspect, an occurrence of a workflow re-evaluation event during execution of tasks in a fragment of a workflow is identified. Thereafter, it is determined for each task previously executed in the workflow fragment whether the corresponding task needs to be executed again. Those tasks for which it was determined that the corresponding task needs to be executed again are executed, while those tasks in the workflow fragment that were previously executed and for which it was not determined that the corresponding task needs to be executed again are skipped.

Articles are also described that comprise a tangible machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, when unexpected changes are introduced, a workflow process need not be re-initiated from scratch, but rather, previous tasks can be re-evaluated in order to determine whether they need to can be used. By using skipping or otherwise using information from previously performed tasks, contextual information can be re-used when re-initiating a workflow process thereby reducing an amount of time and processing resources required to finalize the workflow.

In contrast to conventional techniques, the exception handling approach described herein does not require that actions to handle exceptions be defined. Instead, the actions to handle exceptions (exceptional execution path) are determined on-the-fly, according to the predefined re-evaluation rules and runtime exception/workflow relevant data. i.e., for the same exceptional event, there are potentially multiple exception handling possibilities. This approach allows more dynamics in coping with exceptional circumstances, and breaks the rigidity of the conventional approach (i.e., define exception events—define exception handling policy—detect exception—handle exception according to policy).

Furthermore, the current re-evaluation approach integrates both task and case levels exception handling. The triggering event for re-evaluation can be specified for task level events (e.g., resource unavailability), or case level events (workflow relevant data changed by external sources). Re-evaluation can involve two levels of actions, i.e., case level (Restart) and task level (Restart, Skip task etc.).

Notations for re-evaluation events and re-evaluation rules can be incorporated into existing graph-based process modeling language such as BPMN (business process modeling notation).

E-C-A rules associated with re-evaluations can be provided for easy implementation in process execution engine or the exception handling component of BPMS (business process management systems).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 5 is a table illustrating rules for determining whether a task must be re-executed.

DETAILED DESCRIPTION

Figure 1:
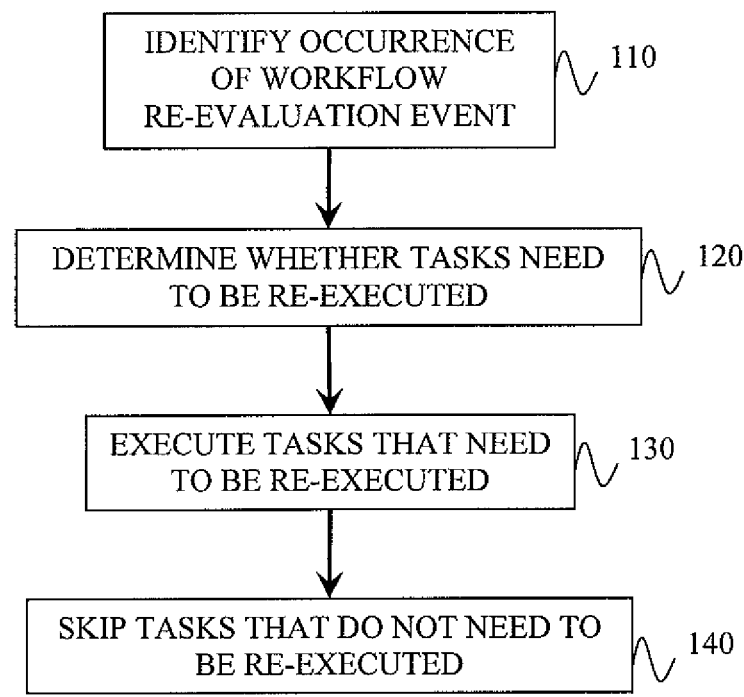
FIG. 1 is a process flow diagram illustrating a technique for executing tasks within a workflow after the occurrence of a workflow re-evaluation event.

FIG. 1 is a process flow diagram illustrating a method 100, in which, at 110, an occurrence of a workflow re-evaluation event during execution of tasks in a workflow is identified. In response to the workflow re-evaluation event, it is determined for each task previously executed in the workflow, at 120, whether such task needs to be executed again. Those tasks in the workflow for which it was determined that the corresponding task needs to be executed again are, at 130, executed again, while the tasks in the workflow that were previously executed and for which it was not determined that the corresponding task needs to be executed again are, at 140, skipped.

Figure 2:
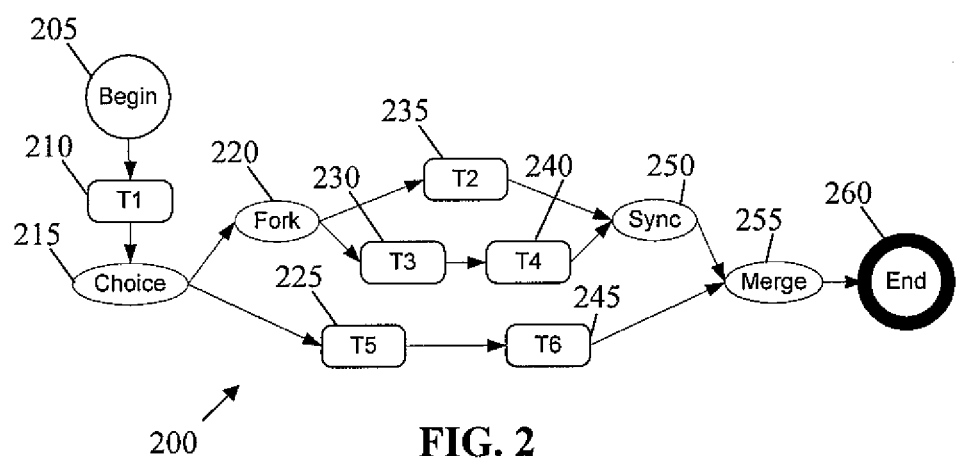
FIG. 2 is a diagram illustrating a first workflow model.

FIG. 2 is a diagram 200 illustrating a workflow model defining a begin state 205 and an end state 260 in which there are a plurality of tasks T1-T6 210, 225-245 with other nodes such as choice 215, fork 220, synchronization 250, and merge 255 nodes logically interposed therebetween. When there is a change to workflow data introduced during execution of T4 240, it is possible, that the new execution will involve other tasks. For example the choice node 215 leads to execution of tasks T5 225 and T6 245. In such a case, T1 210 is a relevant task, and its re-execution should be decided based on what data has changed, T2 230, T3 235, and T4 240 do not have to be re-executed anymore.

Workflow re-evaluation can be characterized as a special case of exception handling. An exception is defined as an exceptional execution state that does not comply with the standard execution of the workflow. Handling exceptions often requires deviations from normal execution arising during a business process. Additionally, the exception handler defines additional steps that are executed if the particular exception occurs. The goal is to bring the workflow back into a state from which the standard execution can continue.

Tasks that have already been executed in the workflow can be re-evaluated once the underlying business object(s) (i.e., a physical or logical object of significance to a business, etc.), for which the workflow has been defined, is changed. The re-evaluation is triggered through an event that notifies the workflow instance about the change. This in turn results in re-evaluating the already executed tasks, and deciding whether they have to be executed again. However, different conditions (typically specified in rules) may apply for the different tasks determining the re-evaluation.

The following modeling elements can be used for specifying re-evaluation rules:

Re-evaluation event on workflow level. This type of event can be assigned to the overall workflow. It can be represented with a graphical element, e.g. a star that is located on a drawing pane containing the workflow model (see, for example, the workflow level re-evaluation event 370 of diagram 300 of FIG. 3).

Re-evaluation event on task level. If a re-evaluation event has been assigned to the overall workflow instance, it is possible to specify rules for each atomic task. These rules for each atomic task can be visualized by a small box adjacent to the task. This box is a symbol representing rules that specify under which conditions the task has to be executed again (see diagram 400 of FIG. 4 for adjacent blocks and table 500 of FIG. 5 for illustrative rules represented by the adjacent blocks). Initially, there may not be any re-evaluation rules specified for tasks, however a default behavior for rules (skip, execute, etc.) can be specified during a modeling phase. The modelers can further decide for which tasks they want to specify a re-evaluation rule. A newly specified rule overwrites the default rule.

In cases in which users desire to avoid specifying re-evaluation events for each task, an event can be assigned to blocks that group parts of the workflow model for which common operations are to be defined.

Figure 3:
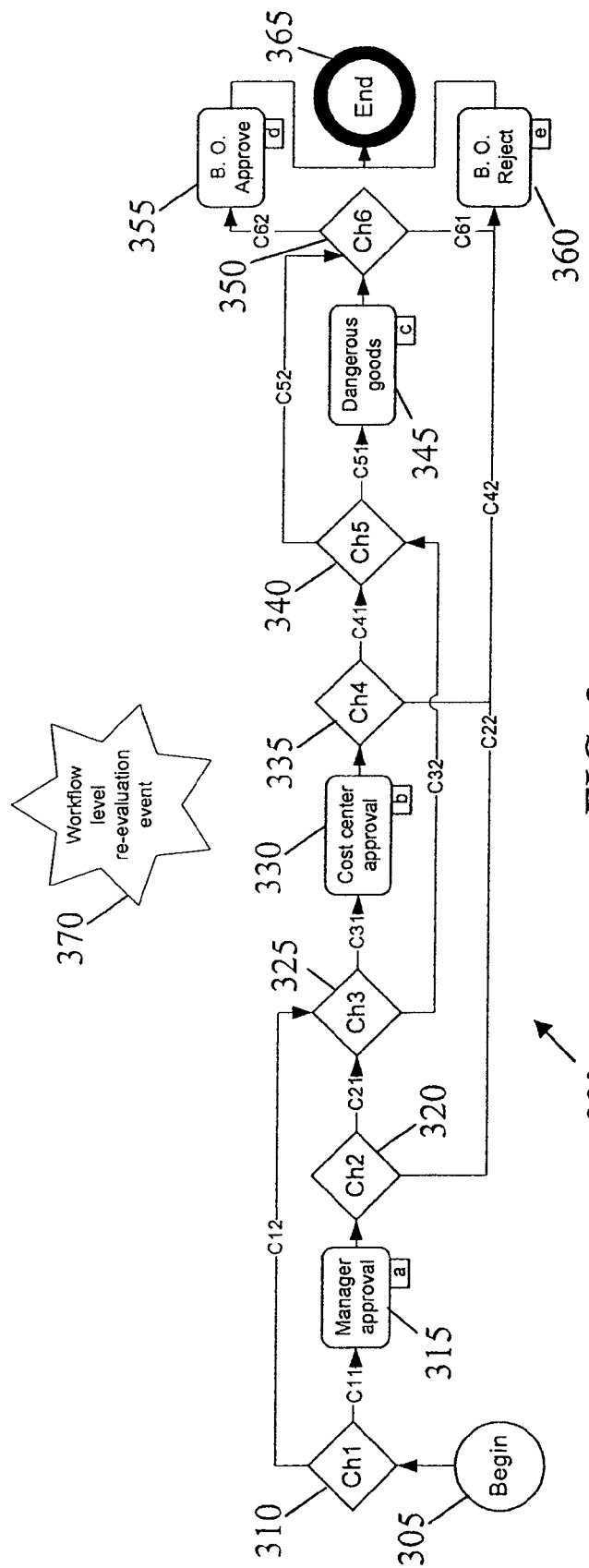
FIG. 3 is a diagram illustrating a second workflow model.

The diagram 300 of FIG. 3 presents a workflow having a begin state 305 and an end state 365 with a plurality of gates 310, 320, 325, 335, 340, 350, tasks 315, 330, 345, 355, 360, and a workflow re-evaluation event 370. The workflow can be executed after an employee creates a business object (BO)—purchase order. There are a few decision steps, formally explained in the top left box in the table 500 of FIG. 5. In general, there are three steps of approval 315, 330, 345, each of them optional, depending on purchase cost and product category. It is allowed that the user changes the business object during the approval process.

A change to a business object may require additional approval steps to be run. For example, if the product was inexpensive, and it did not require cost centre approval, then after a change to a more expensive product in the business object, it will be required to execute cost centre approval task. On the other hand, if product has been changed to a cheaper one, and belonging to the same category (when it comes to dangerous goods approval), no additional actions are needed.

In the diagram 300 illustrated in FIG. 3, odd numbered gates (Ch1 310, Ch3 325, and Ch5 340) provide a basic functionality of skipping tasks if some conditions are met. Such an approach is correct from a modeling point of view, but it brings unnecessary complexity to the diagram. One could imagine that for each task that could be skipped, it is possible to encode the rule into the task. In other words, based on the example, a manager may decide by himself to skip the task, or a rule in manager's system may perform the skip automatically.

Figure 4:
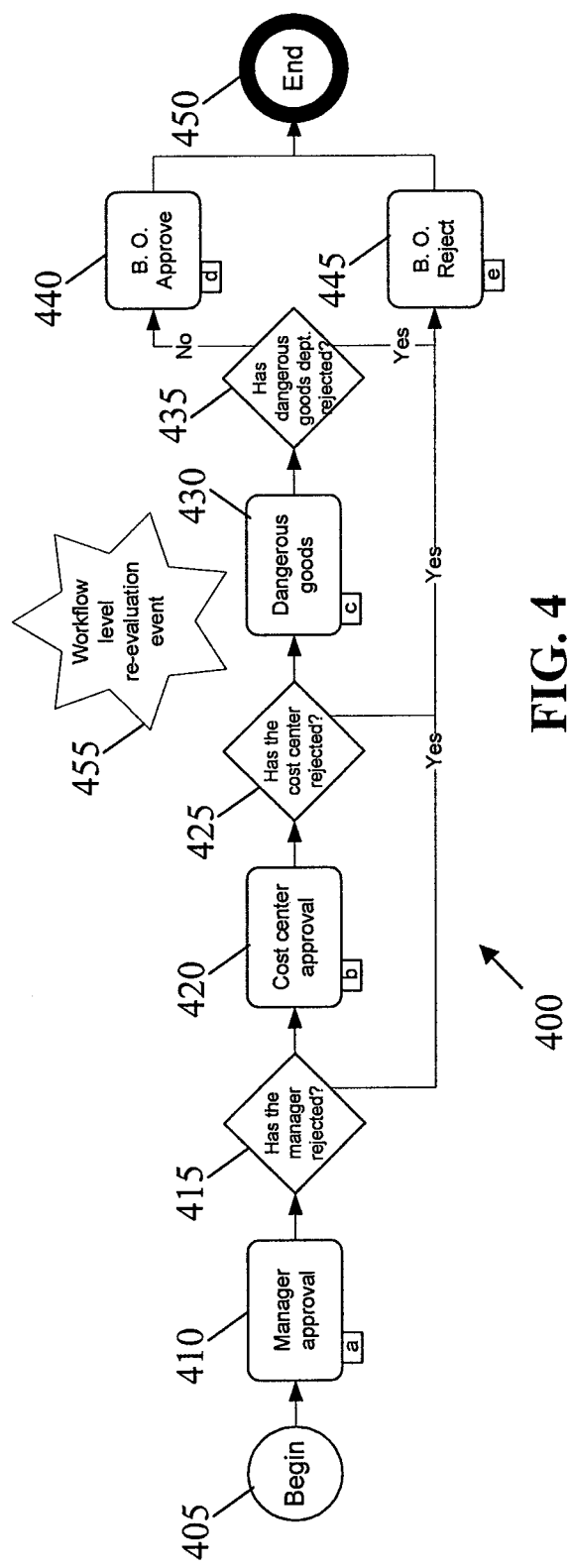
FIG. 4 is a diagram illustrating a third workflow model.

FIG. 4 illustrates a diagram 400 of a workflow similar to the workflow of FIG. 3 that includes a begin state 405 and an end state 450, with a plurality of tasks 410, 420, 430, 440, 450, gating nodes 415, 435, and a workflow level re-evaluation event 455. However, in contrast to FIG. 3, FIG. 4 omits the gates thereby providing a model diagram that can be easier to view.

By including such functions, the complexity of diagrams may improve dramatically. The rules may be incorporated in exactly the same way as re-evaluation rules; the only difference is that they would be executed not only during re-evaluation phase (see diagram 300 of FIG. 3).

In case of a change to a business object as discussed above, a natural reaction, when no workflow management system is employed, is to look at the process and decide which tasks have to be re executed. As processes may include decision points, which will lead to executing different sets of tasks after a change to a business object, the workflow can be simulated to decide which tasks should be (re)considered.

In order to perform workflow re-evaluation tasks, re-evaluation events can be used on a workflow level. Such events monitor changes to business object attributes. Any attribute defined in the event will trigger re-evaluation. In the example given, there are four attributes, change to which triggers reevaluation. They are specified in bottom left box in table 500 of FIG. 5. The additional three attributes specified in the box (ManagerRejected, CostCenterRejected, DangerousGoodsRejected) which cannot be changed by the business object creator, and therefore do not trigger re-evaluation.

Re-evaluation events can also be defined on workflow fragment levels. In case where a specific workflow fragment is executed (for example Physical design) there may be events defined, which trigger re-evaluation of the workflow fragment, not necessarily the whole workflow. For example a change to Logical design could trigger re-evaluation of Physical design workflow fragment.

Each of the tasks may have re-evaluation conditions specified (as in top right box of table 5 of FIG. 5), that can be additionally visualized as small boxes attached to tasks 315, 330, 345 in diagram 300 of FIG. 3, 410, 420, 430 in diagram 400. The re-evaluation conditions specify, whether a task should be re-executed during re-evaluation or not. For tasks that have not been executed before the re-evaluation was triggered, the default behavior should be to execute them, according to workflow specification. For previously executed tasks that do not have specified re-evaluation rules the tasks can be executed by default. In certain cases, a modeler may intentionally opt for a certain task not to have associated re-evaluation rules. However, it is possible that an opposite approach (skip by default) can be used in some cases.

Once re-evaluation is triggered, all active tasks can be suspended (hibernated) if possible, and the workflow management system moves control back to the beginning of the workflow (workflow fragment). Later on, a process flow can be simulated, and re-evaluation rules for particular tasks can be executed. For tasks that have not been executed before, a regular control flow can be performed, just like with any process before re-evaluation. After the process instance completes execution, all remaining hibernated tasks will be canceled.

For all tasks where re-evaluation conditions have been defined in the general workflow model, each re-evaluation condition can be transformed into a corresponding re-evaluation rule.

A rule-based WFMS (workflow modeling system) can make use of a rule inference engine to control the automation of business process, which derives a complete process model based on pre-defined rules. The graphical workflow model (as can be defined by process modelers) can be translated into a set of rules, each of which can be associated with a business task, specifying the properties of the task such as the pre-condition to execute this task and post-condition, after this task is executed successfully. At runtime, according to these rules, the rule-inference engine can examine data and control conditions and determine the order for executing the relevant business tasks. A typical rule in WFMS can be represented in the Event Condition Action (E C A) paradigm:

On event1, . . . ,eventm
IF condition1, . . . ,conditionn
DO action1, . . . ,actionk An event can specify the triggering operation, when a rule is to be evaluated, which indicates the transformation from one execution state to the other. Events are not time consuming and do not include any task performed by an actor. A Condition indicates the pre-conditions to be checked before any action is triggered. An Action states what the subsequent tasks to be performed are, if the condition(s) is satisfied upon the event. The result of executing an action can as well raise an event.

For example, re-evaluation conditions have been defined for Manager approval 315, 410, Cost center approval 330, 420, Dangerous goods 345, 435, B.O.Approve 355, 440, and B.O.Reject 360, in the diagram 300 of FIG. 3 and diagram 400 of FIG. 4 (notice the additional icons labeled respectively a, b, c, d and e, attached to the tasks), which can be transformed into the following re-evaluation rules (cf. Table 1). In Table 1, rules for B.O.Approve, and B.O.Reject are skipped as they are similar to the other ones. The event that triggers re-evaluation of the workflow instance is defined in FIG. 4. Rule rw in Table 1 specifies the workflow level re-evaluation event, while ra, rb and re correspond to the re-evaluation conditions Manager approval, Cost center approval and Dangerous goods.

TABLE 1

Re-evaluation Rules for Process Model

| | |
|---|---|
| rw | ON BOPurchOrd.Product.Name.Changed<br>   OR BOPurchOrd.Product.Price.Changed<br>   OR BOPurchOrd.CostCenter.Changed<br>DO re-evaluate Wf |
| ra | ON re-evaluate 'Manager approval'<br>IF BOPurchOrd.Product.Price changed<br>   AND LastInstance(ManagerRejected).Result = FALSE<br>DO execute 'Manager approval' |
| rb | ON re-evaluate 'Cost center approval'<br>IF (BOPurchOrd.Product.Price changed<br>   AND LastInstance(CostCenterRejected).Result = FALSE)<br>   OR BOPurchOrd.CostCenter !=<br>   LastInstance(CostCenterRejected)<br>DO execute 'Cost center approval' |
| rc | ON re-evaluate 'Dangerous goods'<br>IF ((BOPurchOrd.Product.name changed<br>DO execute 'Dangerous goods' |

For the default behavior, defined in the general workflow model the re-evaluation conditions can be transformed into a set of re-evaluation rules. When evaluation is triggered, the first task(s) in the process can be re-evaluated. The re-evaluation rule (condition) for the task can be first checked (if any), and if condition is satisfied, the task can be executed again. On completion of the re-execution, the system can check for the re-evaluation condition for the subsequent task(s). For tasks with no defined re-evaluation condition, the default behavior can be to execute if it has not been executed previously, and to skip if it has been executed before (task state is completed).

Workflow re-evaluation can be applied to a wide variety of systems in which processes involving human interaction are modeled and executed. Whenever it is possible that during execution of a work flow some unexpected changes may occur, workflow re-evaluation rules are applicable.

Various aspects of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory tangible machine-readable medium embodying instructions that when performed by one or more machines result in operations comprising:
    identifying an occurrence of a workflow re-evaluation event during execution of tasks in a workflow under the control of a workflow management system, the workflow re-evaluation event being an exception execution state that does not comply with standard execution of the workflow, the workflow management system comprising a rules inference engine to control automation of the workflow;
    suspending all active tasks in the workflow;
    determining, for each task previously executed in the workflow, whether each such task needs to be executed again based on the identified occurrence of the workflow re-evaluation event, the determining comprising
        associating, by the rules inference engine using data and control conditions associated with the workflow re-evaluation event, each task with one or more re-evaluation rules, each rule specifying a pre-condition to execute the corresponding task and a post-condition after the task is successfully executed; and
        determining, using the rules inference engine, whether each task needs to be executed again based on the associated re-evaluation rules;
    executing again those tasks in the workflow for which it was determined that the task needs to be executed again, the executing using contextual information from previously performed task;
    executing suspended active tasks in the workflow for which it was determined that the task needs to be executed again;
    skipping those tasks in the workflow that were previously executed and for which it was not determined that the task needs to be executed again, wherein at least one skipped task occurs subsequent to a task executed again in the workflow; and
    canceling any suspended active task upon completion of the workflow.

2. An article as in claim 1, wherein the workflow re-evaluation event is triggered when a business object for which the workflow has been defined is modified.

3. An article as in claim 2, wherein the workflow re-evaluation event is triggered when one of a subset of entities within the business object is modified.

4. An article as in claim 1, wherein the workflow re-evaluation event is assigned to the overall workflow.

5. An article as in claim 1, wherein the workflow re-evaluation event is assigned to one or more of the tasks within the workflow.

6. A method for implementation by one or more data processor comprising:
    identifying, by at least one data processor, an occurrence of a workflow re-evaluation event during execution of tasks in a workflow under the control of a workflow management system, the workflow re-evaluation event being an exception execution state that does not comply with standard execution of the workflow, the workflow management system comprising a rules inference engine to control automation of the workflow;
    suspending all active tasks in the workflow;
    determining, by at least one data processor for each task previously executed in the workflow, whether the task needs to be executed again based on the identified occurrence of the workflow re-evaluation event, the determining comprising
        associating, by the rules inference engine using data and control conditions associated with the workflow re-evaluation event, each task with one or more re-evaluation rules, each rule specifying a pre-condition to execute the corresponding task and a post-condition after; the task is successfully executed; and
        determining, using the rules inference engine, whether each task needs to be executed again based on the associated re-evaluation rules;
    executing again, by at least one data processor, those tasks in the workflow for which it was determined that the task needs to be executed again, the executing using contextual information from previously performed tasks;
    executing suspended active tasks in the workflow for which it was determined that the task needs to be executed again;

skipping, by at least one data processor, those tasks in the workflow that were previously executed and for which it was not determined that the corresponding task needs to be executed again, wherein at least one skipped task occurs subsequent to a task executed again in the workflow; and canceling any suspended active tasks upon completion of the workflow.

7. A method as in claim 6, wherein the workflow re-evaluation event is triggered when a business object for which the workflow has been defined is modified.

8. A method as in claim 7, wherein the workflow re-evaluation event is triggered when one of a subset of entities within the business object is modified.

9. A method as in claim 6, wherein the workflow re-evaluation event is assigned to the overall workflow.

10. A method as in claim 6, wherein the workflow re-evaluation event is assigned to one or more of the tasks within the workflow.

11. A method as in claim 6, further comprising:

suspending, by at least one data processor, all active tasks in the workflow;

executing, by at least one data processor, suspended tasks in the workflow for which it was determined that the task needs to be executed again; and canceling, by at least one data processor, any suspended active tasks upon completion of the workflow.

12. An article comprising a non-transitory tangible machine-readable medium embodying instructions that when performed by one or more machines result in operations comprising:

identifying an occurrence of one of a plurality of workflow re-evaluation event during execution of tasks in a fragment of a workflow under the control of a workflow management system, the workflow re-evaluation event being an exception execution state that does not comply with standard execution of the workflow, the workflow management system comprising a rules inference engine to control automation of the workflow;

suspending all active tasks in the workflow;

determining, for each task previously executed in the workflow fragment using the rules inference engine and data and control conditions associated with the identified occurrence of the workflow re-evaluation event, whether each such task needs to be executed again based on the identified occurrence of the workflow re-evaluation event and based on whether each task has a corresponding re-evaluation rule specifying whether the task should be executed again during re-evaluation;

executing again those tasks in the workflow fragment (i) having re-evaluation rules specifying that the task should be executed again (ii) not having any corresponding re-evaluation rules;

executing suspended active tasks in the workflow for which it was determined that the task needs to be executed again;

skipping those tasks in the workflow fragment that were previously executed and for which it was not determined that the task needs to be executed again, wherein at least one task is skipped subsequent to a task being executed again; and canceling any suspended active tasks upon completion of the workflow.

13. An article as in claim 12, wherein the workflow re-evaluation event is triggered when a business object for which the workflow has been defined is modified.

14. An article as in claim 13, wherein the workflow re-evaluation event is triggered when one of a subset of entities within the business object is modified.

15. An article as in claim 12, wherein the workflow re-evaluation event is assigned to the overall workflow.

16. An article as in claim 12, wherein the workflow re-evaluation event is assigned to one or more of the tasks within the workflow.

* * * * *